(12) United States Patent
Djuric et al.

(10) Patent No.: US 11,420,648 B2
(45) Date of Patent: Aug. 23, 2022

(54) TRAJECTORY PREDICTION FOR AUTONOMOUS DEVICES

(71) Applicant: UATC, LLC, San Francisco, CA (US)

(72) Inventors: Nemanja Djuric, Pittsburgh, PA (US); Sai Bhargav Yalamanchi, Pittsburgh, PA (US); Galen Clark Haynes, Pittsburgh, PA (US); Tzu-Kuo Huang, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 119 days.

(21) Appl. No.: 16/805,714

(22) Filed: Feb. 29, 2020

(65) Prior Publication Data

US 2021/0269059 A1 Sep. 2, 2021

(51) Int. Cl.
*B60W 60/00* (2020.01)
*G05D 1/02* (2020.01)
*G06N 7/00* (2006.01)
*B60W 30/095* (2012.01)

(52) U.S. Cl.
CPC .... *B60W 60/0011* (2020.02); *B60W 30/0956* (2013.01); *B60W 60/00272* (2020.02); *B60W 60/00274* (2020.02); *G05D 1/0214* (2013.01); *G06N 7/005* (2013.01); *B60W 2554/4041* (2020.02)

(58) Field of Classification Search
None
See application file for complete search history.

(56) References Cited

U.S. PATENT DOCUMENTS

| 10,671,076 | B1 * | 6/2020 | Kobilarov | G05D 1/0255 |
| 2019/0382007 | A1 * | 12/2019 | Casas | G06K 9/00335 |
| 2020/0167934 | A1 * | 5/2020 | Bacchus | G06T 7/246 |
| 2020/0174490 | A1 * | 6/2020 | Ogale | G05D 1/0221 |

OTHER PUBLICATIONS

Coulter, "Implementation of the Pure Pursuit Path Tracking Algorithm", Jan. 1992, The Robotics Institute, Carnegie Mellon University, Pittsburgh, Pennsylvania, p. 4-9 (Year: 1992).*
Parra et al., "Visual odometry and map fusion for GPS navigation assistance", 2011 IEEE International Symposium on Industrial Electronics, p. 832-837 (Year: 2011).*

* cited by examiner

*Primary Examiner* — Tamara L Weber
(74) *Attorney, Agent, or Firm* — Dority & Manning, P.A.

(57) ABSTRACT

Systems, methods, tangible non-transitory computer-readable media, and devices associated with trajectory prediction are provided. For example, trajectory data and goal path data can be accessed. The trajectory data can be associated with an object's predicted trajectory. The predicted trajectory can include waypoints associated with waypoint position uncertainty distributions that can be based on an expectation maximization technique. The goal path data can be associated with a goal path and include locations the object is predicted to travel. Solution waypoints for the object can be determined based on application of optimization techniques to the waypoints and waypoint position uncertainty distributions. The optimization techniques can include operations to maximize the probability of each of the solution waypoints. Stitched trajectory data can be generated based on the solution waypoints. The stitched trajectory data can be associated with portions of the solution waypoints and the goal path.

20 Claims, 7 Drawing Sheets

TRAJECTORY PREDICTION FOR AUTONOMOUS DEVICES

RELATED APPLICATION

The present application is based on and claims benefit of U.S. Provisional Patent Application No. 62/978,629 having a filing date of Feb. 19, 2020, which is incorporated by reference herein.

FIELD

The present disclosure relates generally to predicting the trajectory of objects and in particular to using optimization techniques to predict the trajectory of objects over extended time horizons.

BACKGROUND

Vehicles, including autonomous vehicles, can receive data that is used to determine the state of an environment through which the vehicle travels. This data can be associated with various representations of the environment including objects that are present in the environment. As the state of the environment is dynamic, and the objects that are present in the environment can change over time, operation of a vehicle may rely on an accurate determination of the state of the representations of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of trajectory prediction. The computer-implemented method can include accessing, by a computing system comprising one or more computing devices, trajectory data and goal path data. The trajectory data can include information associated with a predicted trajectory of an object. The predicted trajectory can include a plurality of waypoints respectively associated with a plurality of waypoint position uncertainty distributions. The goal path data can include information associated with a goal path and can include a plurality of locations that the object is predicted to travel. The computer-implemented method can include determining, by the computing system, a plurality of solution waypoints for the object based at least in part on application of one or more optimization techniques to the plurality of waypoints and the plurality of waypoint position uncertainty distributions. The one or more optimization techniques can include one or more operations to maximize the probability of each of the plurality of solution waypoints. Furthermore, the computer-implemented method can include generating, by the computing system, stitched trajectory data based at least in part on the plurality of solution waypoints. The stitched trajectory data can include information associated with a stitched trajectory associated with one or more portions of the plurality of solution waypoints and the goal path.

Another example aspect of the present disclosure is directed to a computing system including: one or more processors; a memory including one or more computer-readable media, the memory storing computer-readable instructions that when executed by the one or more processors cause the one or more processors to perform operations. The operations can include accessing trajectory data and goal path data. The trajectory data can include information associated with a predicted trajectory of an object. The predicted trajectory can include a plurality of waypoints respectively associated with a plurality of waypoint position uncertainty distributions. The goal path data can include information associated with a goal path and can include a plurality of locations that the object is predicted to travel. The operations can include determining a plurality of solution waypoints for the object based at least in part on application of one or more optimization techniques to the plurality of waypoints and the plurality of waypoint position uncertainty distributions. The one or more optimization techniques can include one or more operations to maximize the probability of each of the plurality of solution waypoints. Furthermore, the operations can include generating stitched trajectory data based at least in part on the plurality of solution waypoints. The stitched trajectory data can include information associated with a stitched trajectory associated with one or more portions of the plurality of solution waypoints and the goal path.

Another example aspect of the present disclosure is directed to an autonomous vehicle including: one or more processors; a memory including one or more computer-readable media, the memory storing computer-readable instructions that when executed by the one or more processors cause the one or more processors to perform operations. The operations can include accessing trajectory data and goal path data. The trajectory data can include information associated with a predicted trajectory of an object. The predicted trajectory can include a plurality of waypoints respectively associated with a plurality of waypoint position uncertainty distributions. The goal path data can include information associated with a goal path and can include a plurality of locations that the object is predicted to travel. The operations can include determining a plurality of solution waypoints for the object based at least in part on application of one or more optimization techniques to the plurality of waypoints and the plurality of waypoint position uncertainty distributions. The one or more optimization techniques can include one or more operations to maximize the probability of each of the plurality of solution waypoints. The operations can include generating stitched trajectory data based at least in part on the plurality of solution waypoints. The stitched trajectory data can include information associated with a stitched trajectory associated with one or more portions of the plurality of solution waypoints and the goal path.

Other example aspects of the present disclosure are directed to other systems, methods, vehicles, apparatuses, tangible non-transitory computer-readable media, and devices for trajectory prediction.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
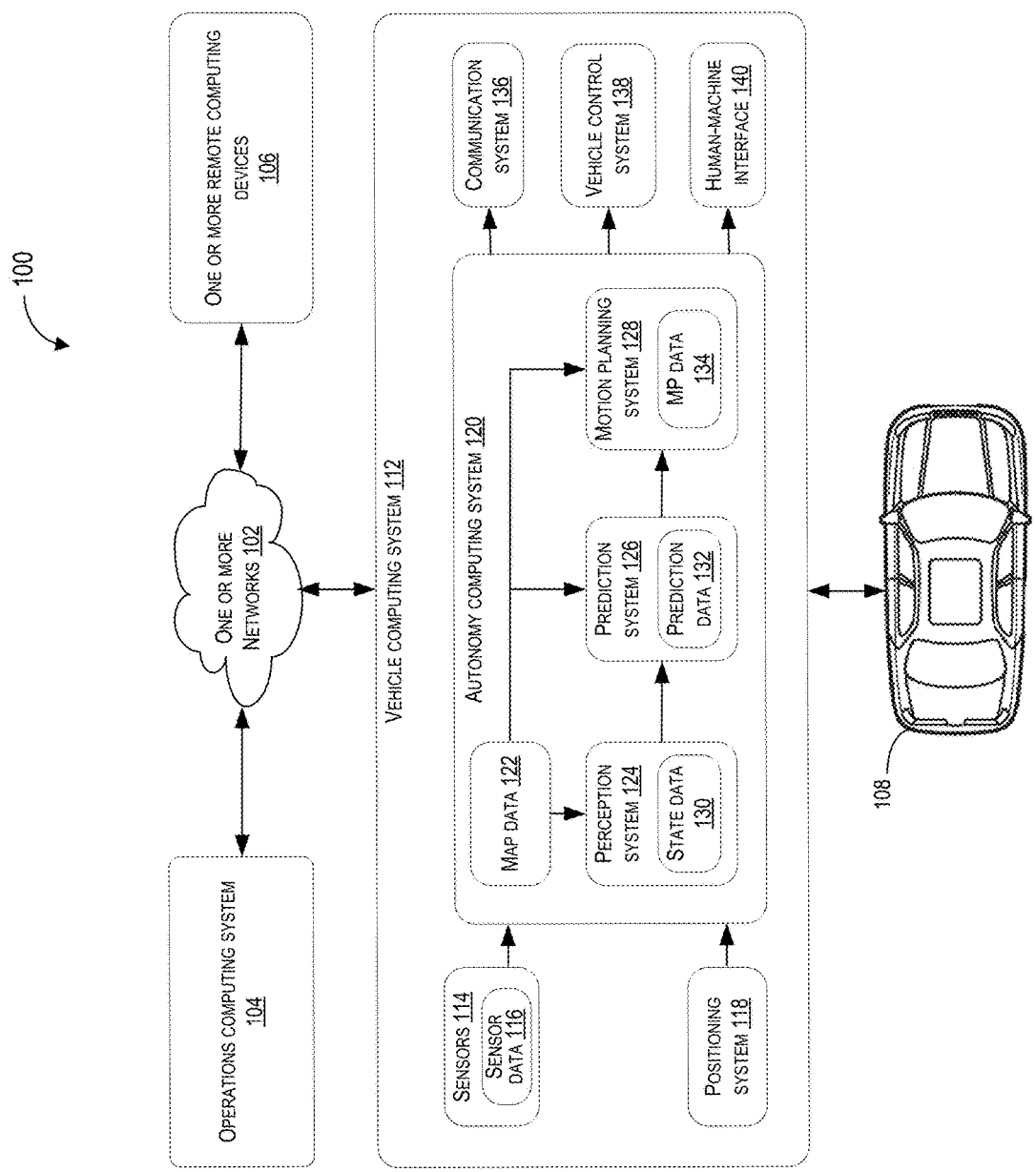
FIG. 1 depicts a diagram of an example system according to example embodiments of the present disclosure.

Example aspects of the present disclosure are directed to determining and predicting the trajectories of objects in an environment, including objects in the environment surrounding an autonomous vehicle. For example, the disclosed technology can be used by an autonomous vehicle to determine and predict the trajectories of other vehicles, pedestrians, and/or cyclists as the autonomous vehicle traverses an environment. Further aspects of the present disclosure include the use of an optimization technique that uses uncertainties associated with the shorter-term trajectory of an object to predict a longer-term stitched trajectory of that object such that the stitched trajectory can combine the shorter-term trajectory with a longer-term predicted goal path.

The trajectories generated by the disclosed technology can be used in a variety of ways, including as an input to a motion planning system of a vehicle. For example, the disclosed technology can use a stitched trajectory that represents a longer-term predicted trajectory of an object over a longer time horizon than the initial shorter-term (e.g., one or two second time horizon) trajectory predictions generated by the prediction system. In this way, the disclosed technology can generate more accurate longer-term predicted trajectories, allowing the vehicle to better navigate the environment, avoid coming into contact with external objects, thereby providing the benefits of improved vehicle safety and more effective vehicle operation.

The disclosed technology can be implemented as a computing system (e.g., a vehicle computing system) that is configured to access a variety of data including trajectory data and/or goal path data. The trajectory data can include information associated with the predicted trajectory of an object (e.g., a vehicle) detected by sensors associated with the vehicle computing system (e.g., a LiDAR device associated with an autonomous vehicle). The trajectory can include waypoints, each of which is associated with a waypoint position uncertainty distribution that is based on the uncertainty associated with the position of each respective waypoint. Furthermore, the goal path data can include information associated with locations (e.g., geographical location) along a goal path that can be longer than the trajectory and can be associated with a set of locations that the vehicle can follow past the waypoints associated with the trajectory. For example, the goal path can include a set of locations associated with the lane of a road. In some alternative embodiments, the predicted trajectory can be the same length or shorter than the goal path.

The vehicle computing system can then determine a plurality of solution waypoints (e.g., the waypoints associated with the most probable location along the predicted trajectory of an object) based at least in part on application of an optimization technique to the plurality of waypoints and respective waypoint position uncertainty distributions. A stitched trajectory that combines the shorter-term trajectory of plurality of solution waypoints with the longer-term trajectory of the goal path can then be generated. This stitched trajectory can in turn be used as an input to a motion planning system, thereby providing the associated autonomous vehicle with more accurate longer-term predictions of the trajectory of objects around the vehicle.

Accordingly, the disclosed technology can improve the effectiveness of trajectory predictions that are generated, particularly longer term predictions. This improvement in the effectiveness of the trajectory predictions that are generated can allow for a large number of improvements in vehicle safety (and the safety of nearby objects) as well as an enhancement of the overall operation of a vehicle and other systems that benefit from better trajectory prediction.

As part of performing the operations described herein, the vehicle computing system can access data including trajectory data and/or goal path data. The trajectory data can include information associated with a predicted trajectory of an object (e.g., a predicted path (set of locations) that the object will follow at future time intervals). Further, the predicted trajectory of the object can include a plurality of waypoints (each waypoint associated with a respective location and future time interval) respectively associated with a plurality of waypoint position uncertainty distributions (e.g., a probability distribution associated with the uncertainty of the position of each waypoint). The goal path data can include information associated with a goal path that can be a longer distance than the predicted trajectory and can include a plurality of locations that the object is predicted to travel.

In some embodiments, the goal path can include information associated with a goal path that can be the same distance or shorter than the predicted trajectory. When the goal path is shorter than the trajectory, an optimization problem used to determine solution waypoints can be solved up to the shorter length of the goal path and the predicted trajectory, and stitched over the remainder of the unused predicted trajectory to a solution path by linearly (as a function of the path distance) decaying the lateral offset that exists between the last stitched solution waypoint and the remainder of the trajectory.

By way of example, the predicted trajectory of the object can be based at least in part on a plurality of predictions associated with one or more motions of the object during a first time interval (e.g., a shorter-time interval between three seconds and six seconds subsequent to a time when the object was detected). Further, the goal path can be based at least in part on a plurality of predictions associated with one or more motions of the object during a second time interval (e.g., a longer-time interval between the time when the object was detected and ten seconds subsequent to the time when the object was detected).

The predicted trajectory and/or the goal path can be associated with and/or based on one or more outputs from various computing systems. In some embodiments, the predicted trajectory and/or the goal path can be based at least in part on output from a prediction system of an autonomous vehicle. For example, the prediction system can include one or more machine-learning models (e.g., one or more deep learning prediction models) that are configured and/or trained to predict the trajectory of one or more objects based at least in part on input including sensor data associated with the one or more objects.

In some embodiments, the plurality of waypoint position uncertainty distributions can be associated with a respective plurality of probability distributions associated with probabilities of the object being at a plurality of positions around each of the plurality of waypoints. For example, the plurality of waypoint position uncertainty distributions can include a probability distribution in which the distribution of a waypoint position is a continuous probability distribution associated with distance from a mean waypoint position. In some embodiments, the probability distribution can include a Gaussian distribution.

In some embodiments, the plurality of waypoint position uncertainty distributions can be based at least in part on application of one or more expectation maximization techniques to an input comprising the plurality of waypoints. For example, the plurality of waypoint position uncertainty distributions can be determined and/or generated based at least in part on an iterative expectation maximization technique using a set of trajectories (e.g., K trajectories $\{T_k\}$), in which each trajectory represents the mean waypoint position over time and space with respect to a goal path.

The goal path can be associated with and/or based on different physical objects and/or sets of locations. In some embodiments, the goal path can be associated with a lane of a road that is being traversed by the object. For example, the vehicle computing system can receive image data (e.g., image data associated with one or more sensor outputs of a sensor including a camera of an autonomous vehicle) associated with one or more images of the road surface in the environment traversed by the object. The vehicle computing system can include a perception system that can determine the location and/or direction of a lane based at least in part on the image data (e.g., based on lane markings and/or lane directions determined from the image data). The goal path can then be determined based on the location and/or direction of the lane. For example, for an object travelling on a straight lane, the goal path can be determined to follow the center of the lane for some predetermined distance (e.g., fifty meters).

In some embodiments, the predicted trajectory can be constrained based at least in part on a plurality of motion constraints of an object model associated with the object. The vehicle computing system can determine the class of an object (e.g., motor vehicle class or pedestrian class) and based at least in part on the class of the object can associate the object with an object model that includes a plurality of motion constraints associated with the motion of the object.

The plurality of motion constraints can include a turning radius of an object and/or one or more constraints on the ability of an object to turn at various velocities. For example, the plurality of motion constraints of a motor vehicle travelling at a velocity of fifty kilometers per hour (50 km/h) can constrain the predicted trajectory of the motor vehicle because the object model indicates that the motor vehicle cannot successfully make a sudden (e.g., over the course of less than one second) ninety degree turn without first slowing down. In some embodiments, the plurality of motion constraints can include one or more constraints on lateral acceleration, such as when an object is turning. Further, the plurality of motion constraints of an object can include constraints on the acceleration (e.g., longitudinal acceleration) of an object.

The vehicle computing system can determine a plurality of solution waypoints for the object based at least in part on application of one or more optimization techniques to the plurality of waypoints and/or the plurality of waypoint position uncertainty distributions. The one or more optimization techniques can include one or more operations to maximize the probability or likelihood (e.g., log likelihood) of a solution waypoint that can be regularized by a deviation cost to a goal path. Further, the one or more optimization techniques can include solution of the following optimization problem:

$$\hat{w} = \underset{x}{\operatorname{argmin}} -\log \mathcal{N}\left(x \mid \mu_w, \sum\nolimits_w\right) + \lambda \cdot p_w \left\| x - \prod\nolimits_G(x) \right\|_2^2.$$

In the preceding optimization problem, $\hat{\omega}$ represents a solution waypoint; N represents the probability density function associated with the waypoint position uncertainty distribution that is associated with a mean value μ and a covariance Σ; x represents a waypoint position; $\Pi_G(x)$ represents the projection of the waypoint position onto x (the goal path); λ represents a regularization coefficient that can be adjusted based on the likelihood of G. In some embodiments, a parameter $p_w$ can be used to determine a schedule with which the regularization coefficient λ is varied.

Each of a plurality of tail probabilities can be associated with a respective probability that a random sample from a normal distribution of each of the plurality of waypoints is further away (e.g., further away in terms of the Mahalanobis distance) from the goal path than a respective projected waypoint of the plurality of projected waypoints. In some embodiments, the normal distribution of the plurality of waypoints can be over the positions and/or locations associated with the plurality of waypoints.

In some embodiments, determining the plurality of solution waypoints can include determining a plurality of compatibility scores based at least in part on the plurality of waypoint uncertainty distributions and each respective closest location of the plurality of locations of the goal path. In particular, the plurality of compatibility scores can be based at least in part on an amount of compatibility between each respective closest location of the plurality of locations of the goal path and the plurality of waypoint uncertainty distributions respectively. Further, each of the plurality of compatibility scores can be respectively associated with the plurality of waypoints. For example, each of the plurality of compatibility scores can be based at least in part on the extent to which the probability of a waypoint position is compatible with the location of the closest location along the goal path. A higher probability of a waypoint position being at (or within a predetermined distance of) the closest location along the goal path can be associated with a greater amount of compatibility and a greater compatibility score.

Further, determining the plurality of solution waypoints can include determining the plurality of solution waypoints based at least in part on the plurality of waypoints associated with a compatibility score that satisfies one or more compatibility criteria. Satisfying the one or more compatibility criteria can include a compatibility score of the plurality of compatibility scores exceeding a compatibility score threshold. For example, the plurality of solution waypoints can include the plurality of solution waypoints that are associated with a compatibility score that exceeds a compatibility score threshold.

In some embodiments, the plurality of compatibility scores can be positively correlated with compatibility between each of the plurality of waypoint uncertainty distributions and each respective closest location of the plurality of locations of the goal path. For example, a greater compatibility score can correspond to greater compatibility between each of the plurality of waypoint uncertainty distributions and each respective closest location of the plurality of locations of the goal path. Conversely, a lower compatibility score can correspond to lower compatibility between each of the plurality of waypoint uncertainty distributions and each respective closest location of the plurality of locations of the goal path.

The one or more compatibility criteria can be associated with and/or based on various aspects of the predicted trajectory and/or goal path. In some embodiments, the one or more compatibility criteria can be based at least in part on a threshold Mahalanobis distance associated a projection of a waypoint onto the goal path. For example, using a waypoint Gaussian distribution $N^t$ and the projection of the waypoint position onto the goal path, $\Pi_G{}^t$. If $\Pi_G{}^t$ is at a Mahalanobis distance $r_t$ from $N^t$, the p-value is the cumulative density function of all points with a Mahalanobis distance that is greater than $r_t$ from $N^t$.

Determination of the plurality of solution waypoints can include the use of various parameters and/or coefficients. In some embodiments, determining the plurality of solution waypoints can include determining the plurality of solution waypoints based at least in part on use of a regularization coefficient associated with a rate of convergence of the plurality of solution waypoints with respect to the goal path. The regularization coefficient can be positively correlated with a rate of convergence of the plurality of solution waypoints with the goal path such that a large regularization coefficient can be associated with a greater rate of convergence of the plurality of solution waypoints with the goal path and a small regularization coefficient can be associated with a lower rate of convergence of the plurality of solution waypoints with the goal path.

In some embodiments, the regularization coefficient can be increased after a last waypoint of the plurality of solution waypoints. The regularization coefficient can be used for a time horizon spanned by each of the plurality of waypoints. In some embodiments, the regularization coefficient can be increased after the time horizon (e.g., a time horizon represented as $T_{comp}$) associated with a waypoint. After $T_{comp}$, the goal path and the predicted trajectory of the object can diverge. In some embodiments, the regularization coefficient can be constant (e.g., the value of the regularization coefficient does not change).

The vehicle computing system can generate data including stitched trajectory data that includes information associated with a stitched trajectory. The stitched trajectory can be based at least in part on the application of one or more path tracking techniques to the plurality of solution waypoints. Further, the stitched trajectory can be associated with one or more portions of the plurality of solution waypoints and the goal path. For example, in a stitched trajectory with two portions, the first portion of the stitched trajectory can be based at least in part on the plurality of solution waypoints which can be interpolations between the plurality of waypoints associated with the predicted trajectory and the goal path (e.g., the plurality of solution waypoints that are the result of optimizing with respect to the waypoint position uncertainties and the goal based regularization costs). Further, the second portion (subsequent to the second portion) of the stitched trajectory can include the goal path.

In some embodiments, the plurality of solution waypoints can represent a plurality of converging waypoints located between the plurality of waypoints and the goal path. For example, the stitched trajectory can have a total distance of fifty (50) meters, with the initial twenty-five (25) meters of the stitched trajectory based at least in part on the plurality of converging waypoints, and the last twenty-five (25) meters based at least in part on the goal path.

In some embodiments, the one or more path tracking techniques can include use of a pure pursuit algorithm that produces a trajectory from the current location of an object and the goal path based on a predetermined lookahead distance to the goal path.

The vehicle computing system can send the stitched trajectory data to a motion planning system of an autonomous vehicle. The motion planning system can then use the stitched trajectory to determine a motion plan for the autonomous vehicle that, for example, avoids contact with the object based on the stitched trajectory. For example, the stitched trajectory of an object approaching an intersection that the autonomous vehicle is also approaching from the opposite direction can indicate that the object will turn into the current travel path of the autonomous vehicle. Based at least in part on the stitched trajectory, the motion planning system can generate a motion path in which the autonomous vehicle avoids contacting the oncoming vehicle (e.g., a motion plan in which the autonomous vehicle slows down, stops, or turns to avoid the oncoming vehicle).

The vehicle computing system can control the autonomous vehicle based at least in part on the stitched trajectory data. Control of the autonomous vehicle can include control of one or more vehicle systems of the autonomous vehicle including one or more engine systems, one or more motor systems, one or more steering systems, one or more braking systems, one or more electrical systems, and/or one or more communication systems. For example, based on a stitched trajectory that indicates that a vehicle directly in front of the autonomous vehicle will make a right turn within the next six seconds, the vehicle computing system can control a steering system of the autonomous vehicle to turn the autonomous vehicle to the left and pass the vehicle in front without contacting that vehicle or significantly reducing the velocity of the autonomous vehicle.

In some embodiments, determining the plurality of solution waypoints and/or stitched trajectory for the object can be based at least in part on and/or include the use of a stitched trajectory framework. Use of the stitched trajectory framework can include solution of the following optimization problem:

$$\operatorname*{argmax}_{y} \log p(y \mid x) - \frac{\lambda_G}{2} \|y - \Pi_G(y)\|^2$$

(hereinafter "Equation 1") in which p(y|x) can denote the predictive density of a future waypoint position $y \in \mathcal{R}^2$ based on one or more features x (e.g., features depicted in one or more raster images), and $\mathcal{G}:=\{G_1, \ldots, G_K\}$ can denote a set of K potential goal paths. Each goal path $G \in \mathcal{G}$ can be associated with a score $S \in [0, 1]$, which could depend on the features x. Each goal can be used to find the most likely (most probable) future waypoint position.

Further, where $\Pi_G(y) \in \mathcal{R}^2$ can denote the projection of y onto the goal path G and $\lambda_G \geq 0$ can be a goal-specific parameter. For a likely (probable) goal, $\lambda_G$ can be set to be a large value so that the solution lies close to the goal path. For an unlikely (less probable) goal, $\lambda_G$ can be set to be a small value so that the solution is more governed by the predictive density p(y|x). Assuming p(y|x) is a 2d Gaussian with mean μ and covariance Σ, Equation 1 can be re-written as follows:

$$\operatorname*{argmin}_{y} \|y - \mu\|_{\Sigma^{-1}}^2 + \lambda_G \|y - \Pi_G(y)\|^2$$

(hereinafter "Equation 2"), in which $\|v\|_Q^2 := v^T Q v$.

Three approaches to using Equation 2 to produce a full dynamically feasible trajectory are listed below in the order of increasing accuracy and computational complexity.

In the first approach, which is the least optimal and the least computationally complex, Equation 2 can be solved for all prediction time steps using time-specific distributions $p(y_t|x)$. A pure pursuit technique can then be used to track the resulting sequence of waypoints.

In the second approach, which has intermediate accuracy and intermediate computational complexity, Equation 2 can be solved sequentially over the prediction time steps, and for time step t. Instead of optimizing over the waypoint, the optimization can be performed over the controls of the following vehicle dynamic model:

$$\theta_t := \operatorname*{argmin}_{\theta \in \Theta} \|M(y_{t-1}, \theta) - u_t\|_{\Sigma_t^{-1}}^2 + \lambda_G \|M(y_{t-1}, \theta) - \Pi_G(M(y_{t-1}, \theta))\|^2,$$

$y_t := M(y_{t-1}, \theta_t)$, in which M (y, θ) denotes the waypoint obtained by applying the controls θ toy using a model M, and Θ denotes the space of controls.

In the third approach, which has high accuracy and high computational complexity, Equation 2 can be solved as a joint optimization problem involving all time steps over the sequence of controls using the following equation:

$$\arg\max_{\{\theta_t\} \in \Theta^T} \sum_{t=1}^{T} \left( \|y_t - \mu_t\|_{\Sigma_t^{-1}}^2 + \lambda_G \|y_t - \Pi_G(y_t)\|^2 \right),$$

s.t. $y_t = M(y_{t-1}, \theta_t)$.

Equation 2 can be rewritten as follows:

$$\min_{y} \|y - \mu\|_{\Sigma^{-1}}^2 + \lambda_G \min_{z \in G} \|y - z\|^2$$

(hereinafter "Equation 3"). The following minimization procedure can be used to solve Equation 3:

Initialize $y_0 := \mu$.
For $t = 1, \ldots, T_{max}$, $$z_t := \arg\min_{z \in G} \|z - y_{t-1}\|^2.$$

$$y_t := \arg\min_{y} \|y - \mu\|_{\Sigma^{-1}}^2 + \lambda_G \|y - z_t\|^2.$$

This procedure can provide several benefits. Firstly, the procedure can decrease the objective value at every iteration. Secondly, both the z and the y updates can be computed efficiently. The z update can be solved by a search along the goal path, which takes linear time in the number of segments in a poly-line representation of the goal path. The y update can be a quadratic program that has a closed-form solution.

The dynamics of the solution path can be controlled by the schedule used to vary the regularization coefficient $\lambda_G$. The dynamics of the solution path can be used to determine when the solution path should break away from the upstream trajectory; and after the solution path breaks away, how quickly the solution path should converge to the goal path.

$\lambda_G$ can be varied as a function of the time horizons when solving the optimization problem in Equation 2 ($\lambda_G$ can be dependent on the time horizon t but this dependence is not indicated in the notation for the sake of brevity). A constant value can be used until the last time horizon where the trajectory waypoint at that horizon is in agreement with the goal path. This time horizon can be represented as $T_{comp}$. Whether a trajectory waypoint at t is in agreement with a goal path G is established by a p-value calculation using the waypoint Gaussian uncertainty distribution $N^t$ and the projection of the waypoint position onto the goal path, $\Pi_G^t$. If $\Pi_G^t$ is at a Mahalanobis distance of $r_t$ from $N^t$, the p-value is the cumulative distribution function (CDF) of all points whose Mahalanobis distance is more than $r_t$ from $N^t$. The waypoint can be determined to agree with G if the p-value is greater than a fixed threshold.

Since the framework deals with rigid body actors (e.g., automobiles) of varying dimensions, in order to establish agreement more accurately between the waypoints and the goal paths, p-values can be computed using the vertices. The Gaussian uncertainty distribution can be translated to each vertex, and the p-value of the projection of the vertex onto the goal path can be considered. The maximum of the resulting set of p-values can be used to determine $T_{comp}$.

The solution path breaks away from the trajectory at $T_{comp}$. After $T_{comp}$, the regularization coefficient can be grown in such a way that the solution path obtained from Equation 2 converges as an inverse function of $f(t) = 1/(t - T_{comp})$ to the goal path. This function can determine how quickly the solution path converges to the goal path after it breaks away. The following equation can be solved for $\lambda_G$.

$$\|y_t - z_t\| = c \times f(t) \text{ (hereinafter "Equation 4")}$$

The closed form solution for $y_t$ in Equation 2 is $y_t = (P + \lambda_G I)^{-1}(P_\mu + \lambda_G z_t)$, in which $P = \Sigma^{-1}$, the precision matrix. Let $P = Q \Lambda Q^t$ be the eigendecomposition of P. Using this, $$y_t - z_t = (P + \lambda_G I)^{-1}[(P_\mu + \lambda_G z_t) - (P z_t + \lambda_G z_t)]$$

$$y_t - z_t = (P + \lambda_G I)^{-1}[P(\mu - z_t)]$$

$$y_t - z_t = [Q(\Lambda + \lambda_G I)Q^T]^{-1}(Q \Lambda Q^T(\mu - z_t))$$

$$y_t - z_t = (Q^T)^{-1}(\Lambda + \lambda_G I)^{-1} \Lambda Q^T(\mu - z_t)$$

Taking the norm, $\|y_t - z_t\| = \|(\Lambda + \lambda_G I)^{-1} \Lambda Q^T(\mu - z_t)\|$ (hereinafter "Equation 5")

From Equation 4 and Equation 5, if we assume $\lambda_G \gg |\Lambda|\infty$, we can get the following:

$$\lambda_G = \frac{\|\Lambda Q^T(\mu - z_t)\|}{cf(t)} = \frac{\|P(\mu - z_t)\|}{cf(t)}.$$

This assumption is reasonable because as the time horizon increases, the uncertainties increase as well. This can cause the eigenvalues of the precision matrix to decrease. The schedule for $\lambda_G$ can therefore be given by:

$$\lambda_G(t) = \begin{cases} \lambda_G^0, & \text{if } t < T_{comp} \\ \lambda_G^0 + \frac{\|P(\mu - z_t)\|}{cf(t)}, & \text{else} \end{cases},$$

in which $\lambda_G^0$ can be set to be a large value for a likely (probable) goal so that the solution lies close to the goal path. For an unlikely (less probable) goal, $\lambda_G^0$ can be set to be a small value so that the solution is more governed by the predictive density.

The following section discusses ways to estimate waypoint uncertainties for the trajectories that were determined using the preceding techniques (e.g., the techniques using Equations 1-5). Given a set of K trajectories $\{T_k\}$, each trajectory representing the mean waypoint position over time and space following a goal path, we can assume that the distribution of the waypoint position at some time horizon t is a mixture of 2d Gaussians in the following trajectory-relative frame:

$$p(y_t | \{\mathcal{T}_k\}) := \sum_k w_k \mathcal{N}(\mathcal{T}_k(y_t) | \mathcal{T}_{k,t}, \Sigma_{k,t})$$

(hereinafter "Equation 6"), in which the (overloaded) notation T(y) maps a position y in the global frame to a trajectory frame defined by T (e.g., the along-trajectory and cross-trajectory offsets relative to T); and $\{w_k > 0\}$ are the probabilities for each trajectory; $T_{k,t}$ is the waypoint position along the k-th trajectory at time horizon t in the trajectory-relative frame; and $\Sigma_{k,t}$ is the covariance of the trajectory-relative coordinates of the waypoint position at time t. Assuming both the weights $\{w_k\}$ and the trajectories $\{T_k\}$ are given, e.g., by path scoring and the methods discussed herein, the covariances $\Sigma_{k,t}$ can be estimated so that the mixture distribution described in Equation 6 resembles the waypoint distribution from upstream p(y|x). This can result in the following minimization problem:

$$\operatorname*{argmin}_{\{\Sigma_k\}} D(p \| p(\cdot | \{\mathcal{T}_k, \Sigma_k\}))$$

(hereinafter "Equation 7"), in which D can denote a distance or divergence measure between distributions. The dependence on t can be dropped to simplify notation ($T_k$ can now denote the trajectory-relative coordinates along the k-th trajectory at the time horizon of interests). If D is chosen to be the KL divergence, Equation 7 can written as follows:

$$\operatorname*{argmin}_{\{\Sigma_k\}} \int p(y|x) \ln\left(\sum_k w_k \mathcal{N}(\mathcal{T}_k(y) | \mathcal{T}_k, \Sigma_k)\right) dy$$

(hereinafter "Equation 8"). Due to the frame transformation, the integral represented in Equation 8 does not have a clean, analytical form. A sampling-based approach can be used in which Equation 8 is solved with respect to a sample of n data points $\{y_i\}$ drawn independent and identically distributed from the upstream distribution p(y|x):

$$\operatorname*{argmin}_{\{\Sigma_k\}} \frac{1}{n} \sum_{i=1}^{n} \ln\left(\sum_k w_k \mathcal{N}(\mathcal{T}_k(y_i) | \mathcal{T}_k, \Sigma_k)\right)$$

(hereinafter "Equation 9"). Equation 9 can be optimized via the following algorithm (e.g., an Expectation Maximization (EM) algorithm):
Initialize $\Sigma_{k,0} := I$.
For iteration j=1, . . . ,
 (The E-step (Expectation step)) For i=1, . . . , n and l=1, . . . , K, $$z_{i,l,j} \leftarrow \frac{w_l \mathcal{N}(\mathcal{T}_l(y_i) | \mathcal{T}_l, \Sigma_{l,j})}{\sum_k w_k \mathcal{N}(\mathcal{T}_k(y_i) | \mathcal{T}_k, \Sigma_{k,j})}$$

(The M-step (Maximization step)) For l=1, . . . , K, $$\Sigma_{l,j} \leftarrow \operatorname*{argmax}_{\Sigma} \sum_i z_{i,l,j} \ln \mathcal{N}(\mathcal{T}_k(y_i) | \mathcal{T}_k, \Sigma) = \frac{\sum_i z_{i,l,j}(\mathcal{T}_l(y_i) - \mathcal{T}_l)(\mathcal{T}_l(y_i) - \mathcal{T}_l)^T}{\sum_i z_{i,l,j}}.$$

The disclosed technology can be implemented by a variety of systems that are configured to determine and predict trajectories. In particular, the disclosed technology can be used as part of a vehicle (e.g., an autonomous vehicle) that determines a stitched trajectory that can be provided as an input to a motion planning system that controls the direction of travel and velocity of an autonomous vehicle in a manner that avoids contact with objects. For example, an autonomous vehicle that more accurately predicts the trajectory of surrounding objects can better maintain an appropriate travel path with respect to pedestrians and other vehicles, thereby navigating the environment with a greater level of safety. Further, improved determination of predicted trajectories can result in a smoother ride and greater passenger comfort.

Furthermore, the disclosed technology can include a computing system that is configured to perform various operations associated with generating a stitched trajectory that can be used to operate a vehicle. In some embodiments, the computing system can be associated with the autonomy system of an autonomous vehicle which can include a perception system, a prediction system, and/or a motion planning system. Furthermore, the computing system can process, generate, modify, and/or access (e.g., send, and/or receive) data and/or information including data and/or information associated with determining solution waypoints, applying optimization and path tracking techniques to the solution waypoints, and generating a stitched trajectory that can be sent to a motion planning system, and/or used to control the autonomy system of the autonomous vehicle. By way of example, in a busy environment filled with a variety of objects (e.g., vehicles, pedestrians, and cyclists), the computing system can use various sensors (e.g., LiDAR, sonar, and/or cameras) and vehicle systems (e.g., perception systems and prediction systems) of an autonomous vehicle to make shorter-term predictions of the trajectories of the objects. The vehicle computing system can then generate control signals that are used to control various vehicle systems (e.g., motors, engines, and/or brakes) so that the vehicle can perform actions including changing the travel path of the vehicle as the vehicle traverses the environment.

The systems, methods, devices, and non-transitory computer-readable media in the disclosed technology can provide a variety of technical effects and benefits to the overall operation of a vehicle and trajectory prediction in particular. By more effectively predicting the trajectories of objects through use of one or more optimization techniques, the disclosed technology can provide various benefits including more accurate long-term trajectory prediction, reduced wear and tear on a vehicle, greater fuel efficiency, improved safety, and/or an overall improvement in the utilization of computational resources that results from the optimization of trajectory prediction.

By optimizing shorter-term trajectory predictions and using path tracking techniques to combine the shorter-term trajectory predictions with longer-term goal paths, the disclosed technology can achieve highly accurate predictions of object trajectory. Further, the optimization techniques used by the disclosed technology are computationally inexpensive, allowing for more rapid prediction of an object's trajectory.

The disclosed technology can also improve the operation of the vehicle by reducing the amount of wear and tear on vehicle components through more gradual adjustments in the vehicle's travel path that can be performed based on the more accurate predicted trajectories of objects in the environment surrounding the vehicle. Furthermore, more accurate prediction of long-term trajectories allows the vehicle to react more proactively, which further improves the efficiency of vehicle operation. For example, more accurate determination of the object trajectories can result in a smoother ride (e.g., fewer sudden course changes) that reduce strain on a vehicle's engine, braking, and steering systems. Additionally, the smoother adjustments by the vehicle (e.g., more gradual turns and acceleration) can result in improved passenger comfort when the vehicle is in transit.

The disclosed technology can further improve the operation of the vehicle by improving the fuel efficiency of a vehicle. For example, more accurate and/or precise prediction of object trajectories can result in a shorter travel path and/or a travel path that requires less vehicle steering and/or acceleration, thereby achieving a reduction in the amount of energy (e.g., fuel or battery power) that is required to operate the vehicle.

Additionally, more effective determination of object trajectories can allow for an improvement in safety for passengers inside a vehicle as well as those outside the vehicle (e.g., pedestrians, cyclists, and passengers of other vehicles). For example, the disclosed technology can more effectively avoid unintentional contact with other objects (e.g., by slowing the vehicle down to avoid the predicted trajectories of objects) through improved prediction of the trajectory of objects. Further, the disclosed technology can activate in-vehicle notification systems (e.g., internal audio systems) to notify passengers of a vehicle of the predicted trajectories of external objects and/or upcoming path changes of the vehicle.

The disclosed technology can reduce the computational resources needed to determine the predicted trajectory of objects by using object physics to constrain trajectory predictions. For example, instead of determining every possible trajectory of an object from a current location, the disclosed technology can associate the object with an object model that includes physical constraints (e.g., turn radius and/or longitudinal acceleration) of the object that constrain the possible trajectory changes to those that are physically possible for the object to perform. As such, the disclosed technology can achieve a reduction in the number of operations that are needed to predict an object's trajectory.

Accordingly, the disclosed technology provides a host of improvements to the generation of a predicted trajectory and the overall operation of associated devices (e.g., autonomous vehicles) in general. In particular, the improvements offered by the disclosed technology result in tangible benefits to a variety of systems including the mechanical, electronic, and/or computing systems of autonomous devices.

With reference now to FIGS. 1-7, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including operations associated with accessing trajectory data include information associated with a predicted trajectory of an object and a plurality of waypoints respectively associated with a plurality of waypoint position uncertainty distributions; accessing goal path data including information associated with a goal path that is a longer distance than the predicted trajectory and includes a plurality of locations that the object is predicted to travel; determining a plurality of solution waypoints for the object based at least in part on application of one or more optimization techniques to the plurality of waypoints and the plurality of waypoint position uncertainty distributions; and generating stitched trajectory data based at least in part on the plurality of solution waypoints.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned models, that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a position of an object relative to the vehicle 108 or other point of reference; a latitude of the object, a longitude of the object, and/or an altitude of an object detected by the one or more sensors 114 of the vehicle 108), the state of a vehicle (e.g., the velocity, acceleration, heading, bearing, position, and/or location of the vehicle 108), and/or the state of objects external to a vehicle (e.g., the physical dimensions, speed, velocity, acceleration, heading, shape, sound, and/or appearance of objects external to the vehicle). In some embodiments, the state data can include one or more portions of the sensor data that is described herein.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the goal path data, the trajectory data, the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude, longitude, and/or altitude), a speed, a velocity, an acceleration, a trajectory, and/or a path of the vehicle 108 based in part on signals or data exchanged with the vehicle 108. In some implementations, the operations computing system 104 can include some of the one or more remote computing devices 106.

The vehicle 108 can be a ground-based vehicle (e.g., an automobile, a motorcycle, a train, a tram, a truck, a tracked vehicle, a light electric vehicle, a moped, a scooter, and/or an electric bicycle), an aircraft (e.g., a fixed-wing airplane, a helicopter, a vertical take-off and landing (VTOL) aircraft, a short take-off and landing (STOL) aircraft, and/or a tiltrotor aircraft), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed, pushed, and/or carried by another vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manually operated mode (e.g., driven by a human driver), a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, speed, velocity, acceleration, heading, location, sound, color, and/or appearance of the environment which can include one or more objects) can be stored locally in one or more memory devices of the vehicle 108. Furthermore, the vehicle 108 can provide data indicative of the state of the one or more objects (e.g., physical dimensions, speed, velocity, acceleration, heading, location, sound, color, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing trajectory data include information associated with a predicted trajectory of an object and a plurality of waypoints respectively associated with a plurality of waypoint position uncertainty distributions; accessing goal path data including information associated with a goal path that is a longer distance than the predicted trajectory and includes a plurality of locations that the object is predicted to travel; determining a plurality of solution waypoints for the object based at least in part on application of one or more optimization techniques to the plurality of waypoints and the plurality of waypoint position uncertainty distributions; and generating stitched trajectory data based at least in part on the plurality of solution waypoints. Furthermore, the one or more memory devices of the vehicle computing system 112 can be used to store data including the sensor data, the training data, and/or the one or more machine-learned models that are stored in the operations computing system 104.

Furthermore, the vehicle computing system 112 can perform one or more operations associated with the control, exchange of data, and/or operation of various devices and systems including vehicles, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more microphones (e.g., a microphone array including a plurality of microphones), one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sound data, sonar data, and/or other data acquired by the one or more sensors 114. The one or more objects detected by the one or more sensors 114 can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of one or more motion features and/or appearance features associated with one or more objects in an environment detected by the one or more sensors 114 including a LiDAR device and/or camera. By way of further example, the sensor data 116 can be indicative of a LiDAR point cloud and/or images (e.g., raster images) associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and determining the state of its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to determine the state of the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan. One or more of the perception system 124, the prediction system 126, and/or the motion planning system 128 can be included in the same system and/or share at least some computational resources (e.g., processors, memory, etc.).

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some embodiments, the prediction data 132 can include trajectory data, goal path data, and/or stitched trajectory data.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat or front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
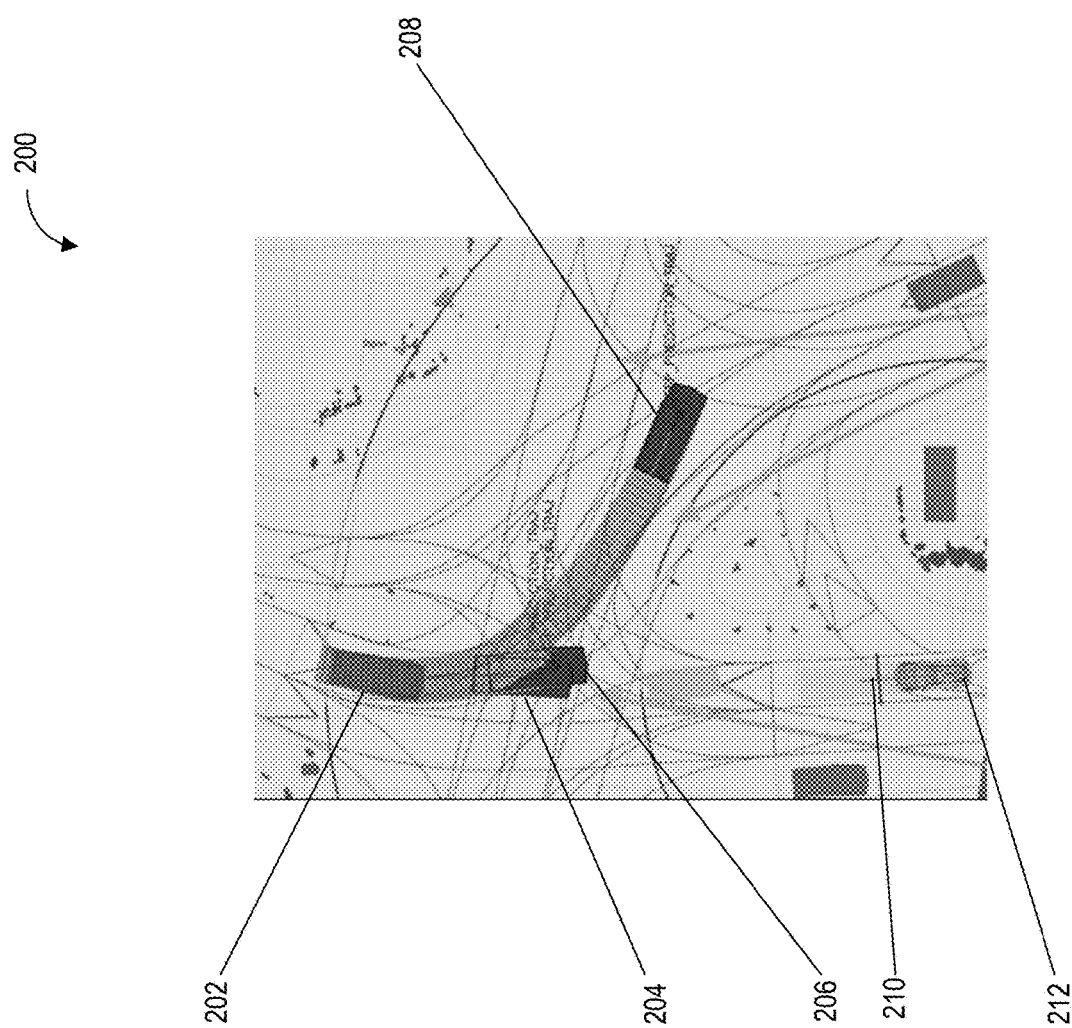
FIG. 2 depicts an example of trajectory determination in an environment according to example embodiments of the present disclosure.

FIG. 2 depicts an example of trajectory determination in an environment according to example embodiments of the present disclosure. One or more operations and/or functions associated with FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features, attributes, and/or capabilities of one or more devices and/or systems including, for example, the operations computing system 104, the vehicle 108, or the vehicle computing system 112, which are depicted in FIG. 1.

As illustrated, FIG. 2 shows an example of an environment image 200 that includes an object 202, a predicted trajectory 204, a predicted trajectory 206, a predicted trajectory 208, a predicted trajectory 210, and the object 212.

The environment image 200 can be an image generated by a computing system (e.g., the vehicle computing system 112) and can include a visual representation of an environment including one or more objects detected by one or more sensors (e.g., one or more sensors 114 of the vehicle 108).

As shown, the environment image 200 includes an object 202 (e.g., a vehicle) that is travelling on a road depicted in the environment image 200. The trajectories 204/206/208 represent different predicted trajectories of the object 202; and the trajectory 210 represents the predicted trajectory of the object 212 (e.g., a vehicle different from the object 202).

Some portion of the predicted trajectories 204/206/208/210 can be determined based at least in part on trajectory predictions generated by a motion prediction system and/or the techniques described herein including accessing trajectory data and goal path data; determining a plurality of solution waypoints; and generating a stitched trajectory. The predicted trajectory 204/206 and/or the predicted trajectory 210 can include respective pluralities of waypoints that represent locations or positions along each respective predicted trajectory. The predicted trajectory 208 can include combination of a plurality of waypoints and a stitched trajectory that is associated with a plurality of solution waypoints and a goal path (e.g., a goal path associated with a road lane on which the object 202 is travelling).

In this example, the object 202 is travelling in the lane of a road and will intersect the predicted trajectory 210 of the object 212 if the object 202 travels along the predicted trajectory 204 or the predicted trajectory 206, which have been determined to be less probable trajectories for the object 202 to follow. Using the techniques described herein, the most probable predicted trajectory can be determined to be the predicted trajectory 208, in which the object makes a left turn to avoid the incoming object 212 and remain within the lane (e.g., a lane that can be associated with a goal path) in which the object 202 was travelling. Further, the predicted trajectory 208 can be associated with a stitched trajectory that represents a long-horizon trajectory for the object 202.

Figure 3:
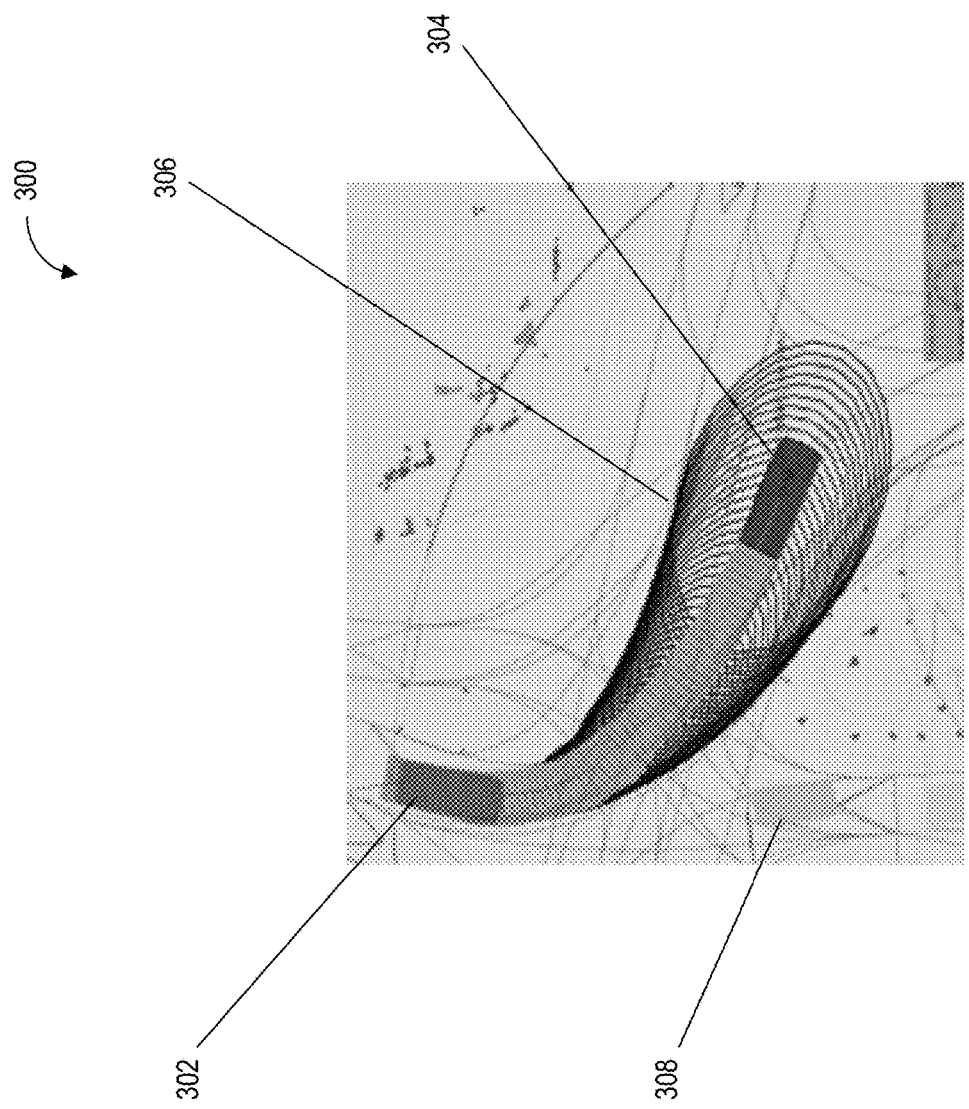
FIG. 3 depicts an example of trajectory determination in an environment according to example embodiments of the present disclosure.

FIG. 3 depicts an example of trajectory determination in an environment according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of an environment image 300 including an object 302, a predicted object trajectory 304, an uncertainty 306, and an object 308.

The environment image 302 can be an image generated by a computing system (e.g., the vehicle computing system 112) and can include a visual representation of an environment including one or more objects detected by one or more sensors (e.g., one or more sensors 114 of the vehicle 108).

As shown, the environment image 300 includes an object 302 (e.g., a vehicle) that is travelling on a road depicted in the environment image 300. The predicted object trajectory 304 of the object 302 can be determined based at least in part on some combination of trajectory predictions generated by a motion prediction system; and/or the techniques described herein including accessing trajectory data and goal path data; determining a plurality of solution waypoints; and generating a stitched trajectory. In some embodiments, the predicted object trajectory 304 can be associated with and/or based at least in part on the plurality of solution waypoints and/or stitched trajectory data.

Furthermore, the environment image 300 can include a visual representation of the uncertainty 306 that is associated with the predicted object trajectory 304. The uncertainty 306 can be associated with and/or based at least in part on the plurality of waypoint position uncertainty distributions described herein. As shown in FIG. 3, the uncertainty 306 that is associated with the predicted object trajectory 304 is depicted by ellipse that represent the amount of uncertainty associated with the object 302 at a particular portion of the predicted object trajectory 304. In some embodiments, the uncertainty 306 can be positively correlated with the size of the depicted ellipse (e.g., greater uncertainty is correlated with a greater size of the ellipse) such that the size of the ellipse increases as the object 302 moves along the predicted object trajectory 304. By way of example, the size of the ellipse associated with the uncertainty 306 can be relatively small for a short time horizon (e.g., the predicted trajectory for the initial three (3) seconds of the object 302 moving from the current location of the object 302). By way of further example, the size of the ellipse associated with the uncertainty 306 can be larger for a longer time horizon (e.g., the predicted trajectory starting after the first three (3) seconds of the short time horizon and continuing for an additional seven (7) seconds).

Figure 4:
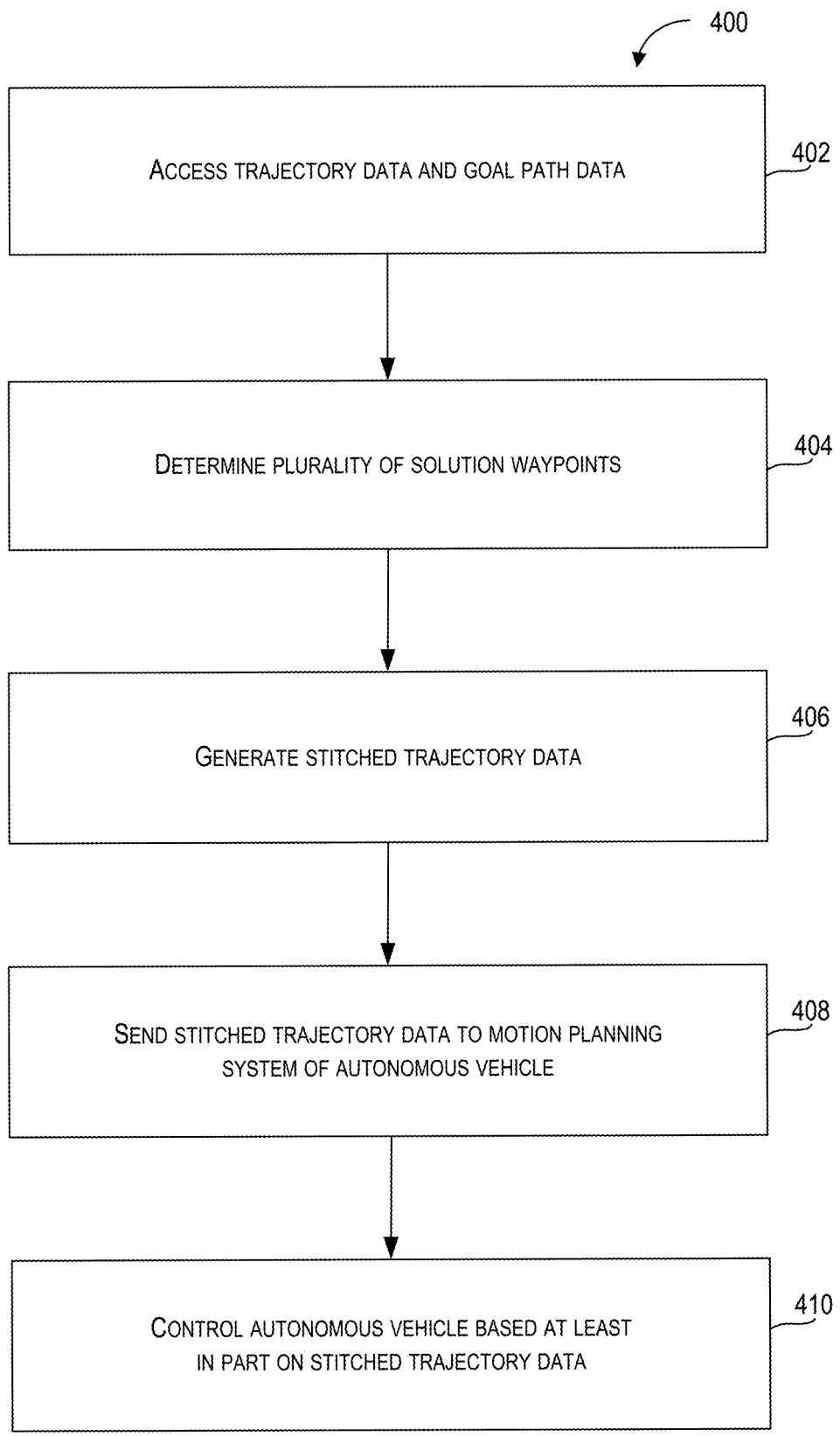
FIG. 4 depicts a flow diagram of an example of trajectory determination according to example embodiments of the present disclosure.

FIG. 4 depicts a flow diagram of an example of trajectory determination according to example embodiments of the present disclosure. One or more portions of a method 400 can be implemented by one or more devices (e.g., one or more computing devices) or systems including, for example, the operations computing system 104, the vehicle 108, or the vehicle computing system 112, shown in FIG. 1. Moreover, one or more portions of the method 400 can be implemented as an algorithm on the hardware components of the devices described herein (e.g., as in FIG. 1). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, the method 400 can include accessing data including trajectory data and/or goal path data. The trajectory data can include information associated with a predicted trajectory of an object (e.g., a predicted trajectory generated by a prediction system of an autonomous vehicle). The predicted trajectory can include a plurality of waypoints (e.g., geographic locations including a latitude, longitude, and/or altitude) respectively associated with a plurality of waypoint position uncertainty distributions. Further, the goal path data can include information associated with a goal path that is a longer distance than the predicted trajectory and can include a plurality of locations (e.g., geographic locations) that the object is predicted to travel. In some embodiments, the goal path data can be based at least in part on a goal path that is associated with one or more physical structures (e.g., road curbs or barriers) and/or visual cues in an environment (e.g., the lane markings of a road) around the object.

By way of example, the vehicle computing system 112 can access data (e.g., trajectory data and/or goal path data stored on a memory device or storage device) including information associated with the predicted trajectory and/or goal path of various objects (e.g., vehicles, pedestrians, and cyclists) detected by the one or more sensors 114 of the vehicle 108 and generated at least in part by the prediction system 126.

At 404, the method 400 can include determining a plurality of solution waypoints for the object. The plurality of solution waypoints can be based at least in part on application of one or more optimization techniques to the plurality of waypoints and the plurality of waypoint position uncertainty distributions. The one or more optimization techniques can include one or more operations to maximize the probability of each of the plurality of solution waypoints.

For example, the vehicle computing system 112 can determine the plurality of solution waypoints for the object by solving one or more optimization equations that include parameters associated with the plurality of waypoints and/or the plurality of waypoint position uncertainty distributions. By way of further example, determining the plurality of solution waypoints can include maximizing the probability of each solution waypoint that is regularized by a deviation cost associated with an amount of deviation of the solution waypoint from the goal path.

At 406, the method 400 can include generating data including stitched trajectory data. The stitched trajectory data can be based at least in part on the plurality of solution waypoints. Further, the stitched trajectory data can include information associated with a stitched trajectory that is associated with one or more portions of the plurality of solution waypoints and/or the goal path.

For example, the vehicle computing system 112 can generate the stitched trajectory data based at least in part on the application of one or more path tracking techniques to the plurality of solution waypoints. The stitched trajectory data can include a predicted trajectory for an object that combines the short time horizon predicted trajectory with a longer time horizon predicted trajectory of the object. For example, the stitched trajectory data can include a stitched trajectory for an object that includes a trajectory of the object from the object's current location over the next six (6) to ten (10) seconds.

At 408, the method 400 can include sending the stitched trajectory data to a motion planning system. The motion planning system can be the motion planning system of an autonomous vehicle (e.g., an autonomous vehicle including the capabilities and/or attributes of the vehicle 108).

For example, the vehicle computing system 112 can perform one or more operations including sending the stitched trajectory data to the motion planning system 128 of the vehicle 108. Further, the stitched trajectory data can be encoded in a format that can be used (e.g., accessed, read, processed, modified, and/or interpreted) by various computing systems including the motion planning system 128.

At 410, the method 400 can include controlling the autonomous vehicle based at least in part on the stitched trajectory data. Controlling the autonomous vehicle can include controlling the movement of the autonomous vehicle (e.g., the direction of travel and/or velocity of the autonomous vehicle) and/or activating or controlling one or more vehicle systems of the autonomous vehicle. The one or more vehicle systems of the autonomous vehicle can include one or more engine systems, one or more motor systems, one or more steering systems, one or more braking systems, one or more safety systems, and/or one or more communications systems. By way of example, the vehicle computing system 112 can use the stitched trajectory data in the determination and/or generation of a motion plan for the autonomous vehicle. The vehicle computing system 112 can then control engine systems and braking systems of the vehicle 108 to maneuver and control the vehicle 108 so that it can safely traverse the environment in accordance with the motion plan.

Figure 5:
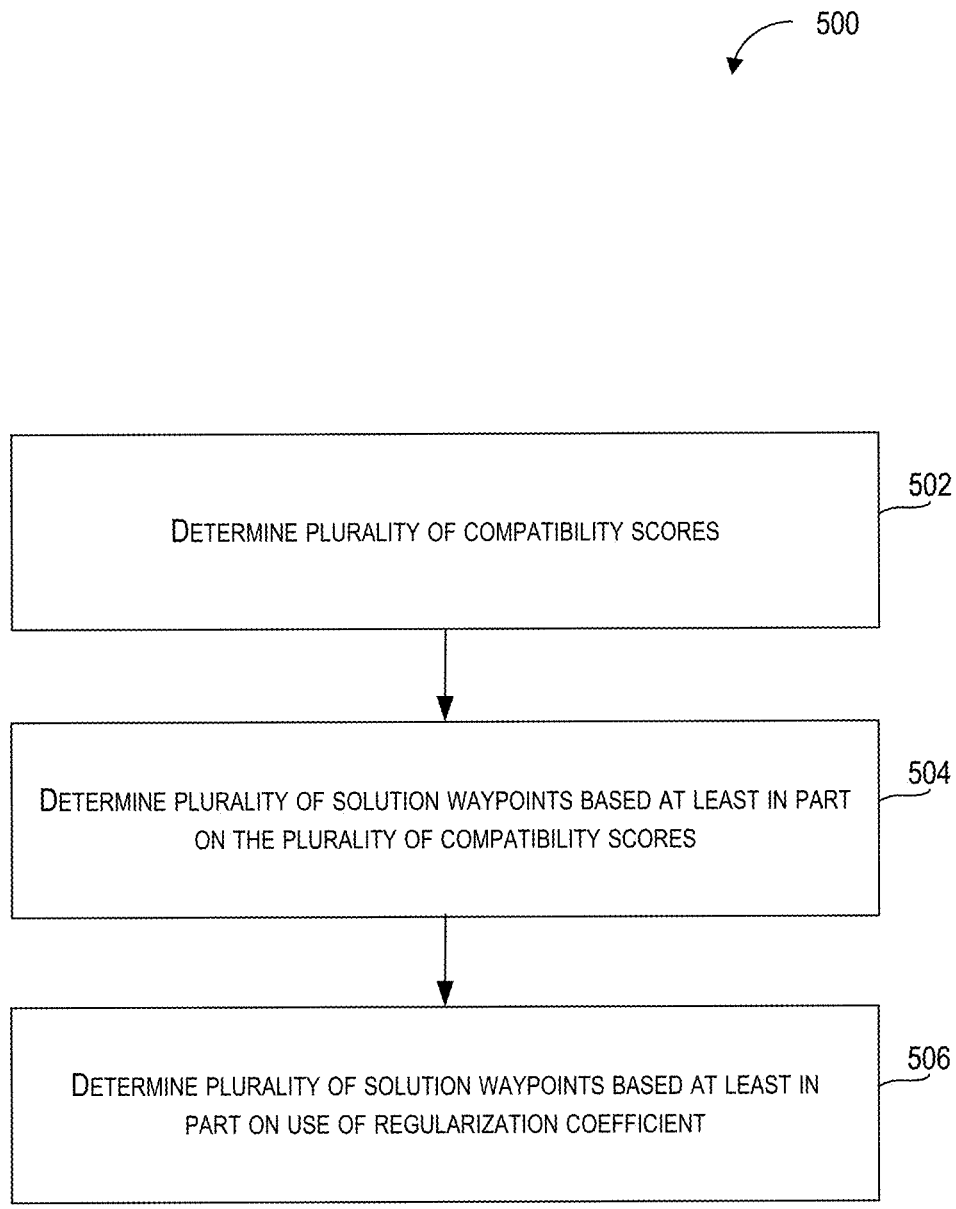
FIG. 5 depicts a flow diagram of an example of trajectory determination according to example embodiments of the present disclosure.

FIG. 5 depicts a flow diagram of an example of trajectory determination according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1). In some embodiments, one or more portions of the method 500 can be performed as part of the method 400 that is depicted in FIG. 4. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include determining a plurality of compatibility scores based at least in part on an amount of compatibility between the plurality of waypoint uncertainty distributions and each respective closest location of the plurality of locations of the goal path. Each of the plurality of compatibility scores can be respectively associated with the plurality of waypoints. The amount of compatibility between the plurality of waypoint uncertainty distributions and each respective closest location of the plurality of locations of the goal path can be based at least in part on a p-value calculation using the waypoint Gaussian uncertainty distribution and a projection of the waypoint onto the goal path. By way of example, the vehicle computing system 112 can determine the compatibility scores based at least in part on analysis of the plurality of waypoint uncertainty distributions and each respective closest location of the plurality of locations of the goal path.

At 504, the method 500 can include determining the plurality of solution waypoints based at least in part on the plurality of waypoints associated with a compatibility score that satisfies one or more compatibility criteria. The plurality of solution waypoints can be based at least in part on the plurality of solution waypoints with a compatibility score that exceeds a threshold compatibility score. By way of example, the vehicle computing system 112 can compare the compatibility score associated with each of the plurality of waypoints to the threshold compatibility score. The vehicle computing system 112 can then determine that the plurality of solution waypoints includes the plurality of waypoints that exceed the threshold compatibility score.

At 506, the method 500 can include determining the plurality of solution waypoints based at least in part on use of a regularization coefficient associated with a rate of convergence of the plurality of solution waypoints with respect to the goal path. For example, the vehicle computing system 112 can use a larger regularization coefficient of 0.9 that is positively correlated with a rate of convergence of the plurality of solution waypoints with the goal path, such that the plurality of solution waypoints have a higher rate of convergence to the goal path.

Figure 6:
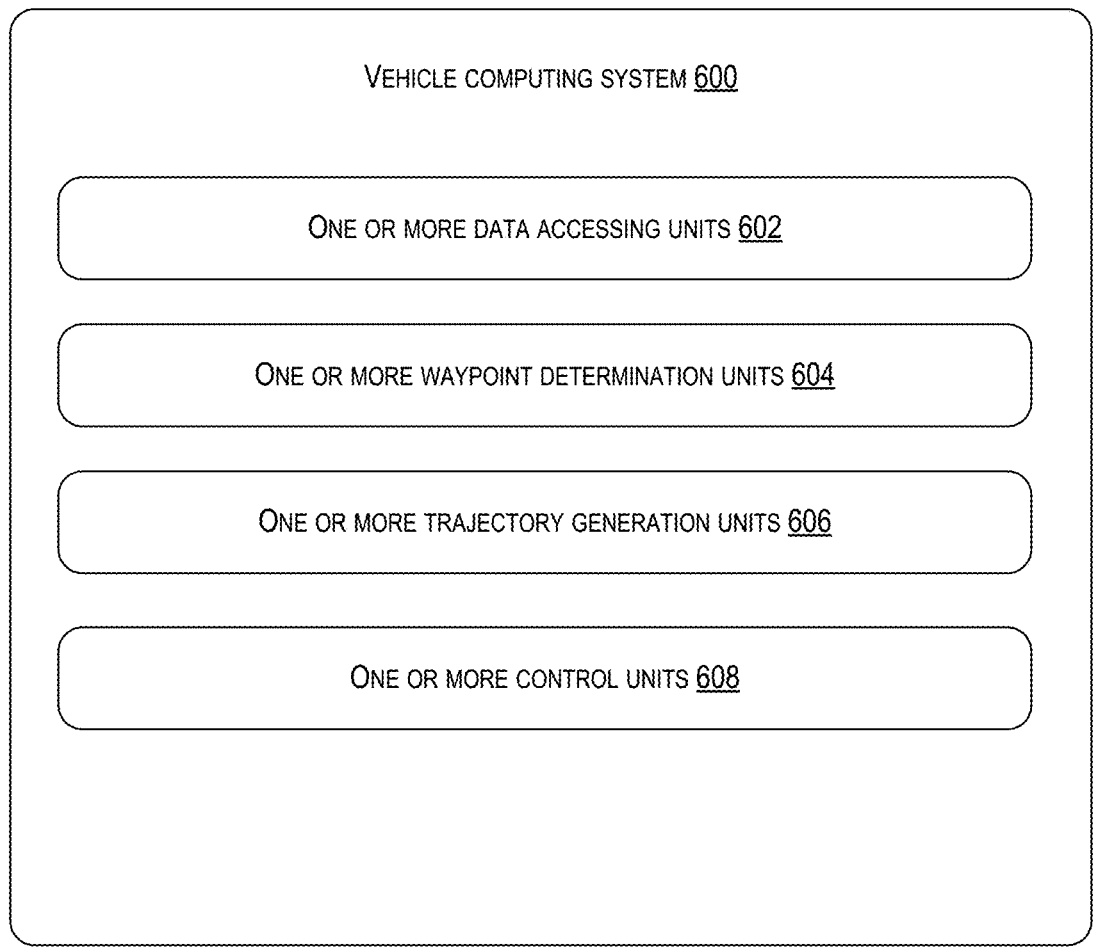
FIG. 6 depicts a diagram of an example system according to example embodiments of the present disclosure.

FIG. 6 depicts a diagram of an example system according to example embodiments of the present disclosure. One or more operations and/or functions in FIG. 6 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 6 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a vehicle computing system can include one or more data accessing units 602, one or more waypoint determination units 604, one or more trajectory generation units 606, one or more control units 608, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a vehicle computing system) or configured (e.g., an ASIC custom designed and configured to operate a vehicle computing system) to perform one or more algorithms for performing the operations and functions described herein. For example, the means (e.g., the one or more data accessing units 602) can be configured to access trajectory data and/or goal path data. The trajectory data can include information associated with a predicted trajectory of an object. The predicted trajectory can include a plurality of waypoints respectively associated with a plurality of waypoint position uncertainty distributions. The goal path data can include information associated with a goal path that is a longer distance than the predicted trajectory and can include a plurality of locations that the object is predicted to travel. Further, the predicted trajectory can be constrained based at least in part on one or more motion constraints of an object model associated with the object. In some embodiments, the predicted trajectory and/or the goal path can be based at least in part on output from a prediction system of an autonomous vehicle.

In some embodiments, the plurality of waypoint position uncertainty distributions in the trajectory data accessed by the one or more data accessing units 602 can be associated with a respective plurality of probability distributions associated with probabilities of the object being at a plurality of positions around each of the plurality of waypoints. Further, the plurality of probability distributions can be based at least in part on a Gaussian distribution.

In some embodiments, the plurality of waypoint position uncertainty distributions in the trajectory data accessed by the one or more data accessing units 602 can be based at least in part on and/or generated through application of one or more expectation maximization techniques to an input comprising the plurality of waypoints.

In some embodiments, the one or more data accessing units 602 can be configured to send the stitched trajectory data to a motion planning system of an autonomous vehicle.

The means (e.g., the one or more waypoint determination units 604) can be configured to determine a plurality of solution waypoints for the object based at least in part on application of one or more optimization techniques to the plurality of waypoints and/or the plurality of waypoint position uncertainty distributions. The one or more optimization techniques can include one or more operations to maximize the probability of each of the plurality of solution waypoints. Further, each of a plurality of tail probabilities can be associated with a respective probability that a random sample from a normal distribution of each of the plurality of waypoints is further away from the goal path than a respective projected waypoint of the plurality of projected waypoints.

In some embodiments, the one or more waypoint determination units 604 can be configured to determine a plurality of compatibility scores based at least in part on an amount of compatibility between the plurality of waypoint uncertainty distributions and each respective closest location of the plurality of locations of the goal path. Each of the plurality of compatibility scores can be respectively associated with the plurality of waypoints.

In some embodiments, the one or more compatibility criteria can be based at least in part on a threshold Mahalanobis distance associated with a projection of a waypoint onto the goal path. Satisfying the one or more compatibility criteria can include a compatibility score of the plurality of compatibility scores exceeding a compatibility score threshold. Further, the plurality of compatibility scores can be positively correlated with compatibility between each of the plurality of waypoint uncertainty distributions and each respective closest location of the plurality of locations of the goal path.

In some embodiments, the one or more waypoint determination units 604 can be configured to determine the plurality of solution waypoints based at least in part on the plurality of waypoints associated with a compatibility score that satisfies one or more compatibility criteria.

In some embodiments, the one or more waypoint determination units 604 can be configured to determine the plurality of solution waypoints based at least in part on use of a regularization coefficient associated with a rate of convergence of the plurality of waypoints with respect to the goal path. In some embodiments, the regularization coefficient can increase after a last waypoint of the plurality of solution waypoints. In some embodiments, the regularization coefficient can be constant. In some embodiments, the regularization coefficient can be based at least in part on a time horizon associate with the plurality of waypoints. For example, a value of the regularization coefficient can vary (increase or decrease) until the time horizon.

The means (e.g., the one or more trajectory generation units 606) can be configured to generate a stitched trajectory based at least in part on the plurality of solution waypoints. The stitched trajectory data can include information associated with a stitched trajectory associated with one or more portions of the plurality of solution waypoints and the goal path. The stitched trajectory data can be based at least in part on the application of one or more path tracking techniques (e.g., a pure pursuit algorithm) to the plurality of solution waypoints. Further, the stitched trajectory can include a portion of the plurality of solution waypoints that represent a plurality of converging waypoints located between the plurality of waypoints and the goal path.

The means (e.g., the one or more control units 608) can be configured to control an autonomous vehicle based at least in part on the stitched trajectory data.

Figure 7:
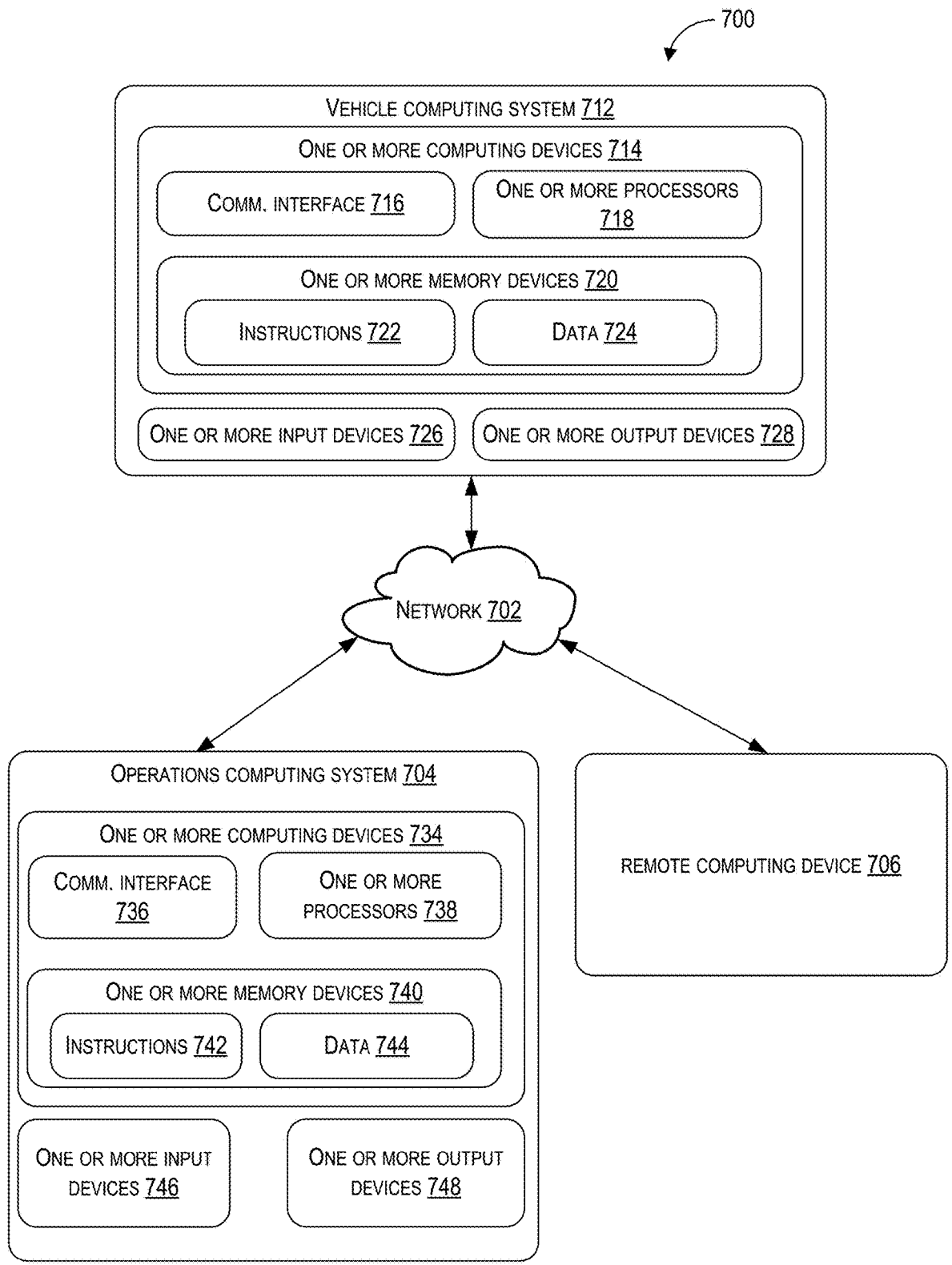
FIG. 7 depicts a diagram of an example system according to example embodiments of the present disclosure.

FIG. 7 depicts a diagram of an example system according to example embodiments of the present disclosure. A system 700 can include a network 702 which can include one or more features of the communications network 102 depicted in FIG. 1; an operations computing system 704 which can include any of the attributes and/or capabilities of the operations computing system 104 depicted in FIG. 1; a remote computing device 706 which can include any of the attributes and/or capabilities of the one or more remote computing devices 106 depicted in FIG. 1; a vehicle computing system 712 which can include any of the attributes and/or capabilities of the vehicle computing system 112 depicted in FIG. 1; one or more computing devices 714; a communication interface 716; one or more processors 718; one or more memory devices 720; computer-readable instructions 722; data 724; one or more input devices 726; one or more output devices 728; one or more computing devices 734; a communication interface 736; one or more processors 738; one or more memory devices 740; computer-readable instructions 742; data 744; one or more input devices 746; and one or more output devices 748.

The vehicle computing system 712 can include the one or more computing devices 714. The one or more computing devices 714 can include one or more processors 718 which can be included on-board a vehicle including the vehicle 108 and one or more memory devices 720 which can be included on-board a vehicle including the vehicle 108. The one or more processors 718 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 718 can include a single processor or a plurality of processors that are operatively and/or selectively connected. The one or more memory devices 720 can include one or more non-transitory computer-readable storage media, including RAM, ROM, EEPROM, EPROM, flash memory devices, magnetic disks, and/or combinations thereof.

The one or more memory devices 720 can store data or information that can be accessed by the one or more processors 718. For instance, the one or more memory devices 720 which can be included on-board a vehicle including the vehicle 108, can include computer-readable instructions 722 that can store computer-readable instructions that can be executed by the one or more processors 718. The computer-readable instructions 722 can include software written in any programming language that can be implemented in hardware (e.g., computing hardware). Further, the computer-readable instructions 722 can include instructions that can be executed in logically and/or virtually separate threads on the one or more processors 718. The computer-readable instructions 722 can include any set of instructions that when executed by the one or more processors 718 cause the one or more processors 718 to perform operations.

For example, the one or more memory devices 720 which can be included on-board a vehicle (e.g., the vehicle 108) can store instructions, including specialized instructions, that when executed by the one or more processors 718 on-board the vehicle cause the one or more processors 718 to perform operations including any of the operations and functions of the one or more computing devices 714 or for which the one or more computing devices 714 are configured, including the operations described herein including operating an autonomous device which can include an autonomous vehicle.

The one or more memory devices 720 can include the data 724 that can include data that can be retrieved, manipulated, created, and/or stored by the one or more computing devices 714. The data stored in the data 724 can include any of the data described herein, including the trajectory data, goal path data, stitched trajectory data, and any data associated with operation of an autonomous device which can include an autonomous vehicle. For example, the data 724 can include data associated with an autonomy system of an autonomous vehicle including a perception system, a prediction system, and/or a motion planning system.

The data 724 can be stored in one or more databases. The one or more databases can be split up so that the one or more databases are located in multiple locales on-board a vehicle which can include the vehicle 108. In some implementations, the one or more computing devices 714 can obtain data from one or more memory devices that are remote from a vehicle, including, for example the vehicle 108.

The system 700 can include the network 702 (e.g., a communications network) which can be used to send and/or receive signals (e.g., electronic signals) or data (e.g., data from a computing device) including signals or data exchanged between computing devices including the operations computing system 704, and/or the vehicle computing system 712. The network 702 can include any combination of various wired (e.g., twisted pair cable) and/or wireless communication mechanisms (e.g., cellular, wireless, satellite, microwave, and radio frequency) and/or any desired network topology (or topologies). For example, the communications network 702 can include a local area network (e.g. intranet), wide area network (e.g. Internet), wireless LAN network (e.g., via Wi-Fi), cellular network, a SAT-COM network, VHF network, a HF network, a WiMAX based network, and/or any other suitable communications network (or combination thereof) for transmitting data to and/or from a vehicle including the vehicle 108.

The one or more computing devices 714 can also include the communication interface 716 used to communicate with one or more other systems which can be included on-board a vehicle including the vehicle 108 (e.g., over the network 702). The communication interface 716 can include any suitable components for interfacing with one or more networks, including for example, transmitters, receivers, ports, controllers, antennas, other hardware and/or software.

The vehicle computing system 712 can also include one or more input devices 726 and/or one or more output devices 728. The one or more input devices 726 and/or the one or more output devices 728 can be included and/or otherwise associated with a human-machine interface system. The one or more input devices 726 can include, for example, hardware for receiving information from a user, including a touch screen, touch pad, mouse, data entry keys, speakers, and/or a microphone that can be configured to detect and/or receive sounds in an environment and/or to be suitable for voice recognition.

The one or more output devices 728 can include one or more display devices (e.g., organic light emitting diode (OLED) display, liquid crystal display (LCD), microLED display, or CRT) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices (e.g., a touch sensitive display device) and/or the audio output devices. Further, the one or more output devices 728 can include one or more audio output devices (e.g., loudspeakers) that can be configured to generate and/or transmit sounds.

The operations computing system 704 can include the one or more computing devices 734. The one or more computing devices 734 can include the communication interface 736, the one or more processors 738, and the one or more memory devices 740. The one or more computing devices 734 can include any of the attributes and/or capabilities of the one or more computing devices 714. The one or more memory devices 740 can store the instructions 742 and/or the data 744 which can include any of the attributes and/or capabilities of the instructions 722 and data 724 respectively.

For example, the one or more memory devices 740 can store instructions, including specialized instructions, that when executed by the one or more processors 738 on-board the vehicle cause the one or more processors 738 to perform operations including any of the operations and functions of the one or more computing devices 734 or for which the one or more computing devices 734 are configured, including the operations described herein including accessing trajectory data include information associated with a predicted trajectory of an object and a plurality of waypoints respectively associated with a plurality of waypoint position uncertainty distributions; accessing goal path data including information associated with a goal path that is a longer distance than the predicted trajectory and includes a plurality of locations that the object is predicted to travel; determining a plurality of solution waypoints for the object based at least in part on application of one or more optimization techniques to the plurality of waypoints and the plurality of waypoint position uncertainty distributions; generating stitched trajectory data based at least in part on the plurality of solution waypoints; and/or using the stitched trajectory data to generate control signals that can be used to control devices and/or systems including an autonomous vehicle.

The one or more memory devices 740 can include the data 744 that can store data that can be retrieved, manipulated, created, and/or stored by the one or more computing devices 734. The data stored in the data 744 can include any of the data described herein including the trajectory data, the goal plan data, and/or the stitched trajectory data.

Furthermore, the operations computing system 704 can include the one or more input devices 746 and/or the one or more output devices 748, which can include any of the attributes and/or capabilities of the one or more input devices 726 and/or the one or more output devices 728.

The remote computing device 706 can include any of the attributes and/or capabilities of the operations computing system 704 and/or the vehicle computing system 712. For example, the remote computing device can include a communications interface, one or more processors, one or more memory devices, one or more input devices, and/or one or more output devices. Further, the remote computing device 706 can include one or more devices including: a telephone (e.g., a smart phone), a tablet, a laptop computer, a computerized watch (e.g., a smart watch), computerized eyewear (e.g., an augmented reality headset), computerized headwear, and/or other types of computing devices. Furthermore, the remote computing device 706 can communicate (e.g., send and/or receive data and/or signals) with one or more systems and/or devices including the operations computing system 704 and/or the vehicle computing system 712 via the communications network 702. In some embodiments, the operations computing system 704 described herein can also be representative of a user device that can be included in the human machine interface system of a vehicle including the vehicle 108.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of trajectory determination, the computer-implemented method comprising:
   accessing trajectory data and goal path data, wherein the trajectory data comprises information associated with a predicted trajectory of an object, the predicted trajectory comprising a plurality of waypoints respectively associated with a plurality of waypoint position uncertainty distributions, and wherein the goal path data comprises information associated with a goal path and comprises a plurality of locations that the object is predicted to travel;
   determining a plurality of solution waypoints for the object based at least in part on application of one or more optimization techniques to the plurality of waypoints and the plurality of waypoint position uncertainty distributions, wherein the one or more optimization techniques comprise one or more operations to determine at least one of the plurality of solution waypoints having an optimized probability of agreement with the goal path;
   generating stitched trajectory data based at least in part on the plurality of solution waypoints, wherein the stitched trajectory data comprises information associated with a stitched trajectory comprising one or more portions of the plurality of solution waypoints defined over a first term and the goal path defined over a second term, the second term being longer than the first term; and
   controlling an autonomous vehicle based at least in part on the stitched trajectory data.

2. The computer-implemented method of claim 1, wherein the determining of the plurality of solution waypoints for the object based at least in part on the application of the one or more optimization techniques to the plurality of waypoints and the plurality of waypoint position uncertainty distributions comprises:
   determining a plurality of compatibility scores based at least in part on an amount of compatibility between the plurality of waypoint position uncertainty distributions and at least one respective closest location of the plurality of locations of the goal path, wherein at least one of the plurality of compatibility scores is respectively associated with the plurality of waypoints; and
   determining the plurality of solution waypoints based at least in part on the plurality of waypoints associated with a compatibility score that satisfies one or more compatibility criteria.

3. The computer-implemented method of claim 2, wherein the one or more compatibility criteria are based at least in part on a threshold Mahalanobis distance associated with a projection of a waypoint onto the goal path.

4. The computer-implemented method of claim 2, wherein the compatibility score that satisfies the one or more compatibility criteria comprises a compatibility score that exceeds a compatibility score threshold.

5. The computer-implemented method of claim 2, wherein the plurality of compatibility scores are positively correlated with compatibility between at least one of the plurality of waypoint position uncertainty distributions and at least one respective closest location of the plurality of locations of the goal path.

6. The computer-implemented method of claim 1, wherein a plurality of tail probabilities are associated with a respective probability that a random sample from a normal distribution of the plurality of waypoints is farther away from the goal path than a respective projection of a corresponding waypoint onto the goal path.

7. The computer-implemented method of claim 1, wherein a portion of the plurality of solution waypoints represent a plurality of converging waypoints located between the plurality of waypoints and the goal path.

8. The computer-implemented method of claim 1, wherein the predicted trajectory is constrained based at least in part on one or more motion constraints of an object model associated with the object.

9. The computer-implemented method of claim 1, wherein the determining of the plurality of solution waypoints for the object based at least in part on the application of the one or more optimization techniques to the plurality of waypoints and the plurality of waypoint position uncertainty distributions comprises:
   determining the plurality of solution waypoints based at least in part on use of a regularization coefficient associated with a rate of convergence of the plurality of solution waypoints with respect to the goal path.

10. The computer-implemented method of claim 9, wherein the regularization coefficient increases after a last waypoint of the plurality of solution waypoints.

11. The computer-implemented method of claim 9, wherein the regularization coefficient varies based at least in part on a time horizon associated with the plurality of waypoints.

12. The computer-implemented method of claim 1, wherein the plurality of waypoint position uncertainty distributions are based at least in part on application of one or more expectation maximization techniques to an input comprising the plurality of waypoints.

13. The computer-implemented method of claim 1, wherein the predicted trajectory or the goal path are based at least in part on output from a prediction system of an autonomous vehicle.

14. The computer-implemented method of claim 1, further comprising:
generating a spatial-temporal trajectory of the object based at least in part on the application of one or more path tracking techniques to the plurality of solution waypoints, wherein the one or more path tracking techniques comprise a pure pursuit algorithm.

15. A computing system comprising:
one or more processors;
one or more non-transitory computer-readable media storing instructions that when executed by the one or more processors cause the one or more processors to perform operations comprising:
accessing trajectory data and goal path data, wherein the trajectory data comprises information associated with a predicted trajectory of an object, the predicted trajectory comprising a plurality of waypoints respectively associated with a plurality of waypoint position uncertainty distributions, and wherein the goal path data comprises information associated with a goal path and comprises a plurality of locations that the object is predicted to travel;
determining a plurality of solution waypoints for the object based at least in part on application of one or more optimization techniques to the plurality of waypoints and the plurality of waypoint position uncertainty distributions, wherein the one or more optimization techniques comprise one or more operations to optimize a probability determined for the plurality of solution waypoints;
generating stitched trajectory data based at least in part on the plurality of solution waypoints, wherein the stitched trajectory data comprises information associated with a stitched trajectory comprising one or more portions of the plurality of solution waypoints defined over a first term and the goal path defined over a second term, the second term being longer than the first term; and
controlling an autonomous vehicle based at least in part on the stitched trajectory data.

16. The computing system of claim 15, further comprising:
sending the stitched trajectory data to a motion planning system of an autonomous vehicle.

17. The computing system of claim 15, wherein the plurality of waypoint position uncertainty distributions are associated with a respective plurality of probability distributions associated with probabilities of the object being at a plurality of positions around at least one of the plurality of waypoints, and wherein the plurality of probability distributions are based at least in part on a Gaussian distribution.

18. An autonomous vehicle comprising:
one or more processors;
one or more non-transitory computer-readable media storing instructions that when executed by the one or more processors cause the one or more processors to perform operations comprising:
accessing trajectory data and goal path data, wherein the trajectory data comprises information associated with a predicted trajectory of an object, the predicted trajectory comprising a plurality of waypoints respectively associated with a plurality of waypoint position uncertainty distributions, and wherein the goal path data comprises information associated with a goal path and comprises a plurality of locations that the object is predicted to travel;
determining a plurality of solution waypoints for the object based at least in part on application of one or more optimization techniques to the plurality of waypoints and the plurality of waypoint position uncertainty distributions, wherein the one or more optimization techniques comprise one or more operations to optimize a probability determined for the plurality of solution waypoints;
generating stitched trajectory data based at least in part on the plurality of solution waypoints, wherein the stitched trajectory data comprises information associated with a stitched trajectory comprising one or more portions of the plurality of solution waypoints defined over a first term and the goal path defined over a second term, the second term being longer than the first term; and
controlling the autonomous vehicle based at least in part on the stitched trajectory data.

19. The autonomous vehicle of claim 18, wherein the goal path is associated with a lane of a road that is being traversed by the object.

20. The autonomous vehicle of claim 18,
wherein the plurality of waypoint position uncertainty distributions are associated with a respective plurality of probability distributions associated with probabilities of the object being at a plurality of positions around at least one of the plurality of waypoints over time and space.

* * * * *